(12) United States Patent
Bourbonnais et al.

(10) Patent No.: US 11,308,119 B2
(45) Date of Patent: Apr. 19, 2022

(54) REPLICATING LARGE STATEMENTS WITH LOW LATENCY

(71) Applicant: International Business Machines Corporation, Armonk, NY (US)

(72) Inventors: Serge Bourbonnais, Palo Alto, CA (US); Austin D'costa, Beaverton, OR (US); Roger Zheng, Richmond Hill (CA); Christian Zentgraf, Columbus, OH (US); David Mooney, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 16/208,538

(22) Filed: Dec. 3, 2018

(65) Prior Publication Data

US 2020/0175034 A1 Jun. 4, 2020

(51) Int. Cl.
*G06F 16/00* (2019.01)
*G06F 16/27* (2019.01)
*G06F 16/23* (2019.01)
*G06F 16/2455* (2019.01)
*G06F 16/2453* (2019.01)
*G06F 16/30* (2019.01)

(52) U.S. Cl.
CPC .......... *G06F 16/27* (2019.01); *G06F 16/2379* (2019.01); *G06F 16/24532* (2019.01); *G06F 16/24568* (2019.01)

(58) Field of Classification Search
CPC ........... G06F 16/2379; G06F 16/24568; G06F 16/24532
See application file for complete search history.

(56) References Cited

U.S. PATENT DOCUMENTS

| 7,290,056 | B1 * | 10/2007 | McLaughlin, Jr. ......................... H04L 43/0852 709/201 |
| 7,752,299 | B2 * | 7/2010 | Bookman ................. G06F 8/51 709/223 |
| 8,352,425 | B2 | 1/2013 | Bourbonnais et al. |
| 9,116,862 | B1 | 8/2015 | Rath et al. |

(Continued)

OTHER PUBLICATIONS

B Lohrmann, P Janacik, O Kao "Elastic stream processing with latency guarantees", 2015 IEEE 35th International Conference on Distributed Computing Systems (Year: 2015).*

(Continued)

*Primary Examiner* — Polina G Peach
(74) *Attorney, Agent, or Firm* — Schmeiser, Olsen & Watts, LLP; Stephanie Carusillo

(57) ABSTRACT

A method, system and computer program product is provided. The method includes identifying a large statement, writing the rows that are changed by the large statement into a set of files outside a database management system recovery log, and writing log records for the set of files to the database management system recovery log, such that the log records provide ordering of row changes made by the large statement. The log records include a log sequence number corresponding to a first row changed and a format and encoding used for the row changes. The method further includes streaming, by the one or more processors of the computer system, the set of files out-of-band by a replication capture process to a target database management system.

17 Claims, 10 Drawing Sheets

(56) References Cited

U.S. PATENT DOCUMENTS

| | | | |
|---|---|---|---|
| 9,378,049 B1* | 6/2016 | Johnson | G06F 13/4068 |
| 9,542,406 B1 | 1/2017 | Bourbonnais et al. | |
| 9,639,630 B1* | 5/2017 | Radhakrishnan | G06F 16/8373 |
| 9,760,598 B1* | 9/2017 | Holenstein | G06F 16/1865 |
| 9,858,305 B2 | 1/2018 | Bourbonnais et al. | |
| 9,875,266 B2 | 1/2018 | Bourbonnais et al. | |
| 9,886,405 B1* | 2/2018 | Johnson | G06F 13/387 |
| 10,015,042 B2 | 7/2018 | Rath et al. | |
| 10,261,801 B2* | 4/2019 | Fisher | G06F 9/4494 |
| 10,545,943 B2* | 1/2020 | Cadarette | G06F 16/27 |
| 10,592,494 B2* | 3/2020 | Diaconu | G06F 16/2365 |
| 10,706,041 B1* | 7/2020 | Hoffmann | G06F 11/004 |
| 10,740,311 B2* | 8/2020 | Noh | G06F 16/2272 |
| 10,776,364 B1* | 9/2020 | Norris | G06F 16/24568 |
| 2009/0313311 A1* | 12/2009 | Hoffmann | G06F 11/2097 |
| 2010/0042999 A1* | 2/2010 | Dorai | G06F 9/466 718/101 |
| 2011/0173619 A1* | 7/2011 | Fish | G06F 16/2365 718/101 |
| 2011/0302164 A1* | 12/2011 | Krishnamurthy | G06F 16/90335 707/737 |
| 2012/0150829 A1* | 6/2012 | Bourbonnais | G06F 16/273 707/703 |
| 2012/0265743 A1* | 10/2012 | Ivanova | G06F 16/2379 707/702 |
| 2012/0324449 A1* | 12/2012 | Huetter | G06F 9/5066 718/1 |
| 2014/0280034 A1* | 9/2014 | Harris | G06F 16/24535 707/718 |
| 2015/0032695 A1* | 1/2015 | Tran | G06F 16/273 707/625 |
| 2016/0171070 A1* | 6/2016 | Hrle | G06F 16/2282 707/615 |
| 2016/0179919 A1* | 6/2016 | Martin | G06F 16/242 707/602 |
| 2017/0032038 A1* | 2/2017 | Relkin | G06F 16/248 |
| 2017/0286229 A1* | 10/2017 | Cheung | G06F 11/1474 |
| 2018/0349458 A1* | 12/2018 | Guirguis | G06F 16/2455 |
| 2020/0012656 A1* | 1/2020 | Pugh | G06F 16/2453 |

OTHER PUBLICATIONS

A. Dobra et al. "Processing Complex Aggregate Queries over Data Streams", 2002, ACM (Year: 2002).*

Authors et al.: Disclosed Anonymously, Method To Promote Unique Constraints For Data Replication, IP.com No. IPCOM000207553D, IP.com Electronic Publication Date: May 31, 2011, 3 pages.

Authors et al.: Disclosed Anonymously, System Monitoring in a Parallel Database Replication Apply Processing, IP.com No. IPCOM000234802D, IP.com Electronic Publication Date: Feb. 7, 2014, 6 pages.

Ashish Gupta et al., High-Availability at Massive Scale: Building Google's Data Infrastructure for Ads, Google Inc. {agupta,jshute}@google.com, 19 pages.

Barzan Mozafari et al., SnappyData: A Unified Cluster for Streaming, Transactions, and Interactive Analytics, 8th Biennial Conference on Innovative Data Systems Research (CIDR '17) Jan. 8-11, 2017 , Chaminade, California, USA., 8 pages.

Mell, Peter et al.; "The NIST Definition of Cloud Computing;" National Institute of Standards and Technology; Special Publication 800-145; Sep. 2011; 7 pages.

* cited by examiner

… (1) US 11,308,119 B2 …

REPLICATING LARGE STATEMENTS WITH LOW LATENCY

TECHNICAL FIELD

The present invention relates to database management systems. More specifically, the invention relates to systems and methods for reducing latency for replicating large statements in active-active configurations.

BACKGROUND

An active-active configuration typically includes independent Database Management Systems (DBMSs) that are kept synchronized using log capture and/or transaction replay replication technology. In active-active configurations, the replication process does not introduce overhead on the applications that are using the DBMS. The distance between DBMSs may be practically unlimited, allowing for sufficient disaster recovery distance. Each DBMS is active and can process transactions concurrently, allowing for workload balancing. Transaction processing can continue even if one of the DBMS goes offline as the result of an outage, a disaster, or maintenance. Further, each DBMS can be configured differently, having different capacities, software versions, operating systems, and so on. An active-active configuration demands very low replication latency between the DBMSs that is typically measured in seconds or fractions of a second, allowing immediate failover for outages, and limiting possible data loss from using asynchronous replication in case of a disaster where one DBMS is permanently lost.

Modern log capture and/or transaction replay replication technology use parallel transaction replay for performance scalability, while preserving transactional integrity. Dependent transactions must be applied in the same order they were committed at the source, but transactions that do not modify the same row and are not involved in mutual constraints can be applied at a target in parallel. In the absence of inter-transaction dependencies, near linear scalability can be achieved while preserving transaction integrity. To determine if any two transactions are updating a common piece of data (row) the entire committed transaction or transactions must be available for inspection.

Transactions in DBMSs are growing increasingly large, particularly when supporting analytics applications for which very large amounts of data (millions of rows or more) are often inserted, updated, or deleted in a single statement. An example of a massive statement is loading hundreds of millions of rows into a database, using an SQL statement such as "insert from select," where the select can be retrieving rows from a file. These massive statements are typically executed in a single unit-of-recovery. Such massive statements either succeed or fail in their entirety, without interim commits. With these prior art techniques, the apply process, and often the capture and transmit processes, cannot begin until the entire transaction is committed. If a transaction takes 15 minutes to execute at the source and 15 minutes to replay, then the end-to-end replication latency be a minimum of 15 minutes assuming instantaneous transmission of the data. Thus, a need exists to shorten the replication latency times for active-active configurations for large statements while maintaining parallel execution of non-dependent transactions for performance scalability.

SUMMARY

An embodiment of the present invention relates to a method, and associated computer system and computer program product. One or more processors of a computer system receive a set of files by a streamed transaction in an out-of-band transmission queue, each file of the set of files including at least one row that is changed, the set of files originating from a large statement received at a source database management system. Changes in the set of files are continuously applied as they are received via the out-of-band transmission queue. A commit or a rollback is applied after the continuously applying step and after receiving a large statement completion message by the source database management system, the large statement completion message reflecting an outcome at the source database management system.

In optional embodiments, an additional transaction is received, during the receiving the set of files by the streamed transaction or the continuous applying, via an inline transmission queue, where the additional transaction has already been committed by the source database management system. The additional transaction received via the inline transmission queue is applied as the additional transaction is received.

In optional embodiments, a message that marks the beginning of the streamed transaction is received via the inline transmission queue. The streamed transactions are marked as being streamed.

In optional embodiments, a first log sequence associated with the streamed transaction is received with the message that marks the beginning of the streamed transaction. A second log sequence number associated with the additional transaction is received. The second log sequence number associated with the additional transaction is determined to come after the first log sequence number associated with the streamed transaction. The method may include waiting to start the continuous applying until after the determining that the second log sequence number associated with the additional transaction is after the first log sequence number associated with the streamed transaction.

In optional embodiments, rows from a statement in any transaction sent via either the inline or out-of-band transmission queue are not applied by the target database management system until all commit or abort source transactions pertaining to the same row or table as the statement and having an log sequence number less than an log sequence number of the statement have been committed or aborted at the target database management system.

In optional embodiments, a dedicated streaming agent associated with the streamed transaction is used. It is ensured that order is respected associated with the streamed transaction using coordination messages that are transmitted over the inline transmission queue. The streamed transaction is enabled to be applied under a single commit scope.

In optional embodiments, a dependency analysis is conducted at a table-level for the streamed transaction.

In optional embodiments, a transaction that is committing after the commit or the rollback of the streamed transaction is held back until after the commit or the rollback of the streamed transaction.

In optional embodiments, transactions that are committed at the source database management system are applied while the streamed transaction is being applied in parallel at the target database management system. Any subsequent files from the set of files are applied after the transactions that are committed at the source database management system are applied and committed by the target database management system.

In optional embodiments, a second set of files associated with a second streamed transaction are received in the out-of-band transmission queue, each file of the second set of files including at least one row that is changed. The set of files originate from a second large statement received at a source database management system. Transactions in the second set of files that are insert-only are identified. The transactions that are identified as insert-only are applied in parallel to the continuously applying the changes in the set of files from the large statement.

In optional embodiments, a dependency analysis is conducted at a table-level if the streamed transaction is determined to be larger than a configurable threshold. The dependency analysis at a row-level is conducted if the streamed transaction is determined to be smaller than the configurable threshold. Operations of another transaction are held back as a result of the dependency analysis.

In optional embodiments, held back operations are scheduled to be applied as a result of the dependency analysis. Operations of the other transactions determined to not have dependencies as a result of the dependency analysis are applied in parallel to the streamed transaction.

In optional embodiments, the large statement completion message is either a commit instruction or a rollback instruction.

In optional embodiments, the large statement is transmitted to the target database management system and applied at the target database management system in parallel to execution at the source database management system without impacting the parallelism of applying other transactions between the source database management system and the target database management system. Replication latency of less than a few seconds is achieved while preserving transaction integrity and ensuring that dependent transactions are applied in the correct order.

In optional embodiments, the inline transmission queue is used for transmitting changes from the source database management system to the target database management system retrievable in source commit order, including coordinating messages for may be used for ordering the files transmitted over the out-of-band transmission queue, which is used for transmitting statements from the source database management system to the target database management system that are larger than a configurable threshold retrievable asynchronously.

In optional embodiments, the out-of-band transmission queue uses multiple transmission channels for using up all available network bandwidth and maximizing transmission speed.

Another embodiment of the present invention relates to a method, and associated computer system and computer program product. One or more processors of a computer system identify a large statement. Rows that are changed by the large statement are written into a set of files outside a database management system recovery log. Log records for the set of files are written to the database management system recovery log, such that the log records provide ordering of row changes made by the large statement. The log records include a log sequence number corresponding to a first row changed and a format and encoding used for the row changes. The set of files are streamed out-of-band by a replication capture process to a target database management system.

In optional embodiments, the set of files is optimized in a format that provides for fast replay by an apply process at the target database management system.

In optional embodiments, the large statement is determined to be larger than a configurable threshold during the identifying of the large statement.

In optional embodiments, multiple written log records are generated during the writing the log records, each containing a subset of log data pertaining to the large statement.

In optional embodiments, the large statement is transmitted to the target database management system and applied at the target database management system in parallel to execution at the source database management system without impacting the parallelism of applying other transactions between the source database management system and the target database management system. A replication latency of less than a few seconds is achieved while preserving transaction integrity and ensuring that dependent transactions are applied in the correct order.

In optional embodiments, a notification from the target database management system is received via a file transfer control queue when files from the set of files are applied. Files from the set of files are deleted after receiving the notification.

In optional embodiments, the written set of files is separately grouped based on the type of operation.

DETAILED DESCRIPTION

Figure 1:
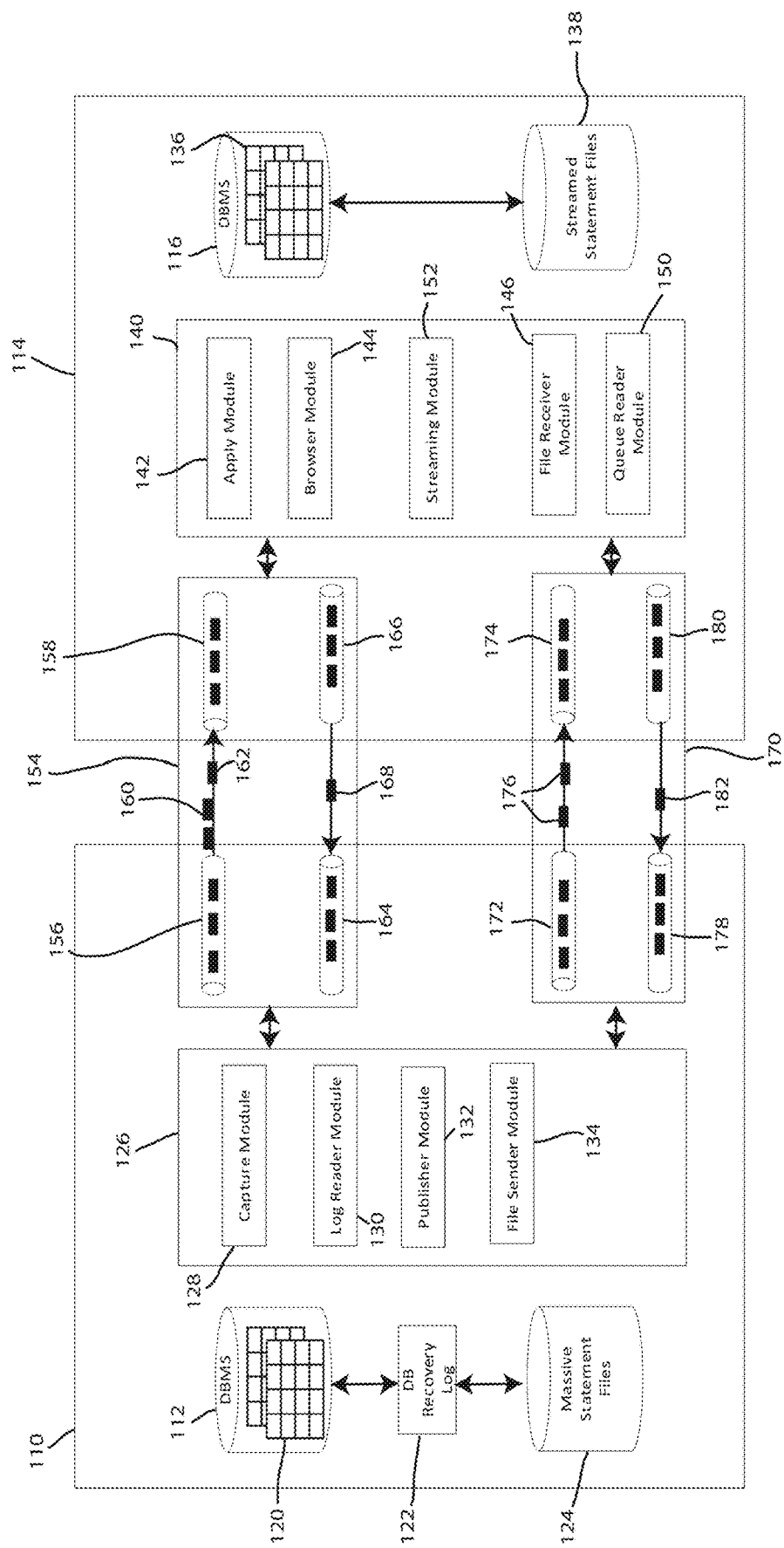
FIG. 1 depicts a block diagram of a system of replicating large statements with low latency, in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention recognizes that prior art systems are inadequate for replication of massive or large statements in active-active DBMS configurations. This is because in active-active DBMS configurations, a copy may be used for live reporting or hot failover, making low replication latencies crucial latencies of no more than a few seconds). Additionally, modern DBMSs handle a mix of online transaction processing (OLTP), and online analytical processing (OLAP), OLAP may include massive statements, inserting, deleting or updating millions of rows. The present invention improves computer performance and DBMS performance, by providing predictable, reliable end-to-end replication latency of seconds, rather than minutes or even hours, for these types of mixed workloads. The present invention improves computer performance and DBMS performance by allowing massive statements within a transaction to be replicated, even when one or more operations within the massive statement would otherwise introduce delays beyond an acceptable latency threshold.

The present invention allows for massively large statements to be transmitted and applied to a target DBMS in parallel to their execution at the source DBMS, without impacting the parallelism of applying other transactions. The present invention thus achieves improved computer performance by achieving an overall replication latency of seconds or even as low as a fraction of a second for replication of large or massive statements in an active-active database configuration. The present invention further preserves transactional integrity and ensures that dependent transactions are applied in a correct order through dependency analysis and the use of log sequence numbers (LSN) in the manner described herein.

A "large statement" herein is a single DBMS statement that modifies a number of rows larger than a threshold. The threshold may be defined by the latency that would occur during a replication process in an active-active configuration—i.e. if a statement would incur replication latency over several seconds (e.g. 1 second, 3 seconds, 5 seconds, or 10 seconds), this may be considered a large statement. The threshold may be defined by a size of the statement, i.e. any statement requiring a transfer of more than 10 MB may be considered large. A large statement may also be referred to as a massive statement. A "streamed transaction" herein is a transaction that is transmitted and applied at a target DBMS in parallel to its execution at a source DBMS. A "log sequence number" (LSN) herein is a unique sequence number for log records written by a DBMS for recovery purposes that provides an ordering of statement execution. An "inline transmission queue" herein is a queue that is used for transmitting changes from a source database to a target database and from which those changes can be retrieved in source commit order, or source log order. An "out-of-band transmission queue" herein is a queue that is used for the asynchronous transmission of changes for a large statement out-of-band from the inline transmission queue. An "out-of-band" may also be referred to as an "out-of-line" transmission queue.

A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Referring to the drawings, FIG. 1 depicts a block diagram of a system of replicating large statements with low latency 100, in accordance with embodiments of the present invention. The system of replicating large statements with low latency 100 includes a first site 110 including a source DBMS 112, and a second site 114 including a target DBMS 116. The first site 110 and the second site 114 may be located any physical distance apart. For example, the location of the first site 110 and the second site 114 may provide for a sufficient disaster recovery distance. The first and second sites 110, 114 may be a data center, a group of networked servers for remote storage or distribution of large amounts of data, or the like. In one embodiment, the first and second sites 110, 114 may each be located at a single physical location. In some embodiments, the first site 110 and the second site 114 may each include servers located at multiple locations. The first site 110 may be connected to one or more user computers 118 which may include applications configured to interact with the source DBMS 112 by providing commands, statements, or the like, to the source DBMS 112 for processing.

The source DBMS 112 is shown including user tables 120, a database recovery log 122, and massive statement files 124. The source DBMS 112 further includes a module structure 126 that includes a capture module 128, a log reader module 130, an event publish module 132, and a file sender module 134. The target DBMS 116 is shown including user tables 136, streamed statement files 138, and a module structure 140 including an apply module 142, a browser module 144, a file receiver module 146, a que reader module 150 and a streaming agent module 152. An inline transmission interface 154 is shown including a send queue 156, a receive queue 158 for sending and receiving both captured transactions 160 and coordination messages 162. The inline transmission interface 154 further includes an administration receiving queue 164 and an administration sending queue 166 for sending and receiving administrative messages 168. An out-of-band transmission interface 170 includes a send queue 172, and a receive queue 174 for sending and receiving out-of-band files 176 and/or file messages. The out-of-band transmission interface 170 includes a second send queue 173, and a second receive queue 174 for sending and receiving out-of-band files 177 and/or file messages. The out-of-band transmission interface 170 further includes an acknowledgement receiving queue 178 and an acknowledgement sending queue 180 for sending and receiving acknowledgement messages 182 and/or other control messages.

The invention is not limited to a single out-of-band transmission interface 170, and may include more than one out-of-band transmission interface. Further, while the out-of-band transmission interface is shown including two respective queue pairs (172-174 and 178-180), each out-of-band transmission interface 170 may include any number of respective queue pairs depending on the need, how much information is being sent, and the number of transactions being simultaneously streamed.

The arrows showing the flow of information through the send queue 172 and the receive queue 174 in one direction representing the primary direction of information flow in one embodiment. However, the invention may include additional queues. The DBMSs 112, 116 may transmit messages in the inline transmission interface 154 and the out-of-band transmission interface 170 in both directions. For example, the source DBMS 112 may include a receive queue and the target DMBS 116 may include a send queue, allowing for transmissions in the out-of-band transmission interface 170 in the opposite direction to that which is shown in FIG. 1. Thus, in such situations it is contemplated that the reverse process may be provided, and the flow of the inline transmission interface 154 and the out-of-band transmission interface 170 may be reversed.

The source DBMS 112 may be configured to identify any large and/or massive statements received by the user computers 118 pertaining to the user tables, for example, stored in the source DBMS 112. This identification may include determining the size of the large statement, the size of information which must be transmitted from the source DBMS 112 to the target DBMS 114, or the like. This identification may take into account a likely file transfer time based on network connection speeds between the source DBMS 112 to the target DBMS 114. For example, faster transmission speeds may allow for larger statements to be considered regular non-large statements. The source DBMS 112 may thus be configured to allow for a change of settings or configurations as to what constitutes a large statement, based on any appropriate factor.

The source DBMS 112 may be configured to write the rows in the large and/or massive statements received that are inserted, deleted, updated or modified in any other manner by this statement into a set of files, shown as the massive statement files 124, that are located outside of a DBMS recovery log 122. The massive statement files 124 may be stored outside the database recovery log 122 in a format that is optimized for fast replay by the apply module 142 of the target DBMS 116. For example, the source DBMS 112 may be configured to sort or group the large statement files 124 by size, and/or by the type of operation (i.e. insert, delete, update, etc.). In some embodiments, the DBMS 112 is configured to sort or group the set of files by the table or rows being operated on by the files.

The files within the massive statement files 124 are configured to be transmitted from the source DBMS 112 to the target DBMS 116 out-of-band and/or asynchronously via the out-of-band transmission interface 170. To accomplish this out-of-band and/or asynchronous transmission, the capture module 126 of the source DBMS 112 may be configured to capture log records associated with the massive statement files 124. Thus, the out-of-band transmission interface 170 has no requisite order and is used to transmit rows for streamed transactions. In one embodiment, files are used to contain those rows that are written by the source DBMS 112. While massive statements may be written to files for transmission of rows out-of-band, not all files or transmissions related to massive or large statements may be transmitted out-of-band—some files or rows for streamed transactions may remain transmitted in the inline transmission interface 154.

Coordination between the target DBMS 116 and the source DBMS 112 may be achieved for this out-of-band transmission. To accomplish this coordination, the source DBMS 112, by for example the capture module 126, may be configured to write log records to the database recovery log 122. These log records may include ordering of the row changes made by the large or massive statements that are written to the external massive statement files 124. When a massive statement is detected or otherwise identified by the source DBMS 112, the log module 130 may be configured to write a log record that indicates a log sequence number (LSN) of at least the first row changed, as well as the format and encoding used for the rows. The log module 130 may be configured to write a log record for each row changed in this manner.

Once a transaction or statement received by the source DBMS 112 is determined to be larger than a configurable threshold, it is streamed using the capture module 128, the log reader module 130, the publisher module 132 and the file sender module 134 in accordance with the methods and processes described herein. The apply module 142 of the target DBMS 116 may then be configured to apply the changes within the streamed files even before it is known whether the target DBMS 116 will be instructed to commit or abort/roll back the changes. Non-streamed transactions may continue to be transmitted through the inline transmission interface 154 after they have been committed at the source DBMS 112 during the streaming process of the massive or large statement and set of files associated therewith. Thus, a replicated workload for the source DBMS 112 and the target DBMS 116 may include both a mix of massive or large statements sent in the out-of-band transmission interface 170 and non-large or non-massive statements sent in the inline transmission interface 154. The out-of-band transmission interface 170 and the modules 128, 130, 132, 134, 142, 144, 146, 150, 152 of the DBMSs 112, 116 may be configured to send multiple massive or large statements, and associated sets of files, concurrently over the out-of-band transmission interface 170.

The inline transmission interface 154 may be configured to transmit the coordination messages 162 from the source DBMS 112 to the target DBMS 116 so that the apply module 142 may process in a strict source commit order. These coordination messages 162 associated with the files sent in the out-of-band transmission interface 170 may include log sequence numbers (LSNs) for preserving strict commit order for the sent out-of-band file 176. This ordering may be required for proper dependency analysis to be completed by the apply process of the target DBMS 116, as described herein below. In one embodiment, the captured transactions 160 may be sent in parallel to the coordination messages 162 but delivered in strict commit order by the out-of-band transmission interface 170. The send queue 156 may contain both the inline captured transactions 160 (i.e. small statements that have already been committed by the source DBMS 112) and the coordination messages 162.

A coordination log record may be written by the log reader module 130 each time it closes a file from the set of files containing rows for the large statement. This log record may include information about the file location and enough additional details for the capture module 128 to associate the file with the transaction, the table, the statement, and the execution of the rows. The capture module 128 may obtain the file name and location from the coordination log record. The capture module 128 may then be configured to transmit the file across the out-of-band transmission interface 170 to the target DBMS and the apply module 142 thereof. The coordination log records may be written in a transaction that contains either or both of large statements split and transmitted out-of-band or non-large statements transmitted inline.

A large statement may be written into as many files as needed to contain the rows modified by each statement, and for each partition in a partitioned database or DBMS. In one embodiment, the delete operations, the insert operations, and the update operations may be grouped separately into three sets of files within the set of files written for a massive or large statement. Thus, a file may contain the changes for only one type of operation and/or for a single table or even a single row. All row changes must be ordered by their LSN in the file writing.

All written files in a set of files written from a large statement may be transmitted using the out-of-band transmission interface 170, and the send queue 172 or other queuing server. In one embodiment, there may be more than one out-of-band transmission interface 170, each with its own file transmission queue or queuing server.

Each file may contain rows in a format optimized for replay by the apply module 142 of the target DBMS 116. The files may be sent in a message that identifies the transaction and table that is modified. A file may be transferred immediately after it is written or closed, and transmitted while the source DBMS is still processing the rest of the transaction, writing the files representing the large statement, etc. In one embodiment, the file size for each file may be relatively small (e.g. kilobytes). In one embodiment, each file size may be determined by the replication latency time that would be associated with transmitting the file to the target DBMS 116. The maximum file size may be configurable. The file size may be configured to minimize the transaction delay from waiting for the file to be closed. The file size may further allow for optimization in transportation. For example, the source DBMS 112 and/or the file sender module 134 thereof may batch several files together into a single file for transmission. Conversely, a very large file may be transmitted using several messages by the file sender module 134. In one embodiment, the file sender module 134 may be configured to determine the optimal message size for performance based on distance and/or file size. Each file may further include row changes that are optimized for efficient replay by the target DBMS 116. In one embodiment, the files may be in a format suitable as direct input to a LOAD utility, which may be in a binary format.

The out-of-band transmission interface 170 may be configured to transmit the files asynchronously such that the files and messages may arrive through the out-of-band transmission interface 170 to the target DBMS 116 in any order. For example, a file might arrive before a message with the LSN that indicates the start of the transaction and its order within the sequence of changes.

The capture module 128 may further be configured to delete files that have been transmitted after receiving a notification, such as the acknowledgement message 182, from the target DBMS 116 and the apply module thereof 142 indicating that the apply process is completed by the target DBMS 116 for a given file.

At the target DBMS 116, the file receiver module 146 may first be configured to receive a message from the inline transmission interface 154 notifying the DBMS 116 that a large statement is going to be streamed to the target DBMS 116, and notifying which table or set of rows will be impacted. Upon receiving this message, the apply module 142 may be configured to mark the transaction as streamed. The apply module 142 may be configured to wait before starting to process or apply any file received for this transaction until a commit LSN for any in-line transaction that also modifies the same table and/or rows as the large statement have passed the LSN of the large statement. This may allow a previous delete of a row inserted by the large statement to be committed at the target DBMS 116 prior to the application of the large statement.

The apply module 142 may be configured to start a new dedicated streaming agent that continuously applies the rows as they are received for the set of files associated with the large statement. The apply module 142 may further be configured to apply files or messages received from the inline transmission interface 154 as they are received, in parallel to the apply of the set of files being received out-of-band. Coordination messages for files transmitted may ensure the order can be respected. The streaming agent may be associated with the transaction that is being streamed from the source DBMS 112, until completion. This association may allow for the streamed transaction to be applied under a single commit scope over the connection that is established by the streaming agent to the target DBMS 116.

The optimized format of transmitted row data for the large statement may be different from the format of the transmitted row data of a non-massive statement received from the inline transmission interface 154. For example, it may be determined not to be efficient to perform unique key based row dependency analysis for finding transaction dependencies. Instead, table level dependency analysis may be used for detecting dependencies of massive statement rows for one streamed transaction against other transactions (large or small).

Hybrid dependency analysis using table level dependency for massive or large statements and unique key based row level dependency for non-massive or non-large statements may include rules or principles to ensure proper dependency analysis. For example, rows from a massive or large statement in a streamed transaction will not be applied by the target DBMS 116 until all committed source transactions (both streamed and non-streamed) with a commit LSN less than the LSN of the massive or large statement file log record have been applied and committed on the target DBMS 116 first, if the committed source transactions involve rows from the same table as the massive or large statement pertains. As another example rule, rows from a non-massive statement in any transaction (streamed or non-streamed) cannot be applied during the streaming transmission of a transaction until all committed or aborted source transactions (both streamed and non-streamed) having an LSN less than the LSN of the non-massive statement (or commit LSN of its transaction) have been applied by the target DBMS 116 first, if the non-massive statement pertains to the same rows or tables as the streaming transaction.

The dependency analysis conducted by the target DBMS 116 may be conducted purely at the table-level (rather than row-level) for efficiency and space saving when the target DBMS 116 receives a streamed transaction. For example, if two back-to-back streamed transactions contain massive statements that are updating the same table, the transactions may be serialized (i.e. replayed in the same order as that of the source DBMS 112) based on the fact that they have a table in common. Further, any transactions that are currently committing after the commit of a streamed transaction by the source DBMS 116, and are updating the same table as the streamed transaction, may be held back until the streamed transaction has been committed or aborted at the target DBMS 116. Transactions that are committed at the source DBMS 112 while a streamed transaction is currently being applied by the target DBMS can be applied in parallel by the target DBMS 116. However, any subsequent block of rows for the streamed transaction may be applied after the committed transactions have been applied at the target DBMS 116. If two streamed transactions are identified as insert-only, the target DBMS 116 can apply these transactions in parallel, regardless of whether the two streamed transactions pertain to the same tables or rows. The dependency analysis conducted by the target DBMS 116 may thus include serializing new incoming changes of a transaction only behind other transactions that have touched the same tables and have already seen their commit or abort from the source DBMS 112.

Upon receiving a streamed transaction completion message from the source DBMS 112, the target DBMS 116 and/or the apply module 142 thereof, may be configured to either commit or roll back to reflect the outcome at the source DBMS 112. Dependent transactions that were held back while the streamed transaction was being applied can then be scheduled to be applied, or applied according to an already pre-determined schedule. Transactions without dependencies that were received during the streamed transaction may be applied in parallel by the target DBMS 116, thereby preventing a large backlog of transactions that will require processing after the streamed transaction.

The source DBMS 112 and the target DBMS 116 may be connected via a network utilized by the inline transmission interface 154 and the out-of-band transmission interface 170. The network may be any group of two or more computer systems linked together. The network may be the internet. The network system connecting the source DBMS 112 and the target DBMS 116 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network may be a peer-to-peer network in some embodiments. In other embodiments, the network may be organized as a client/server architecture.

Figure 2:
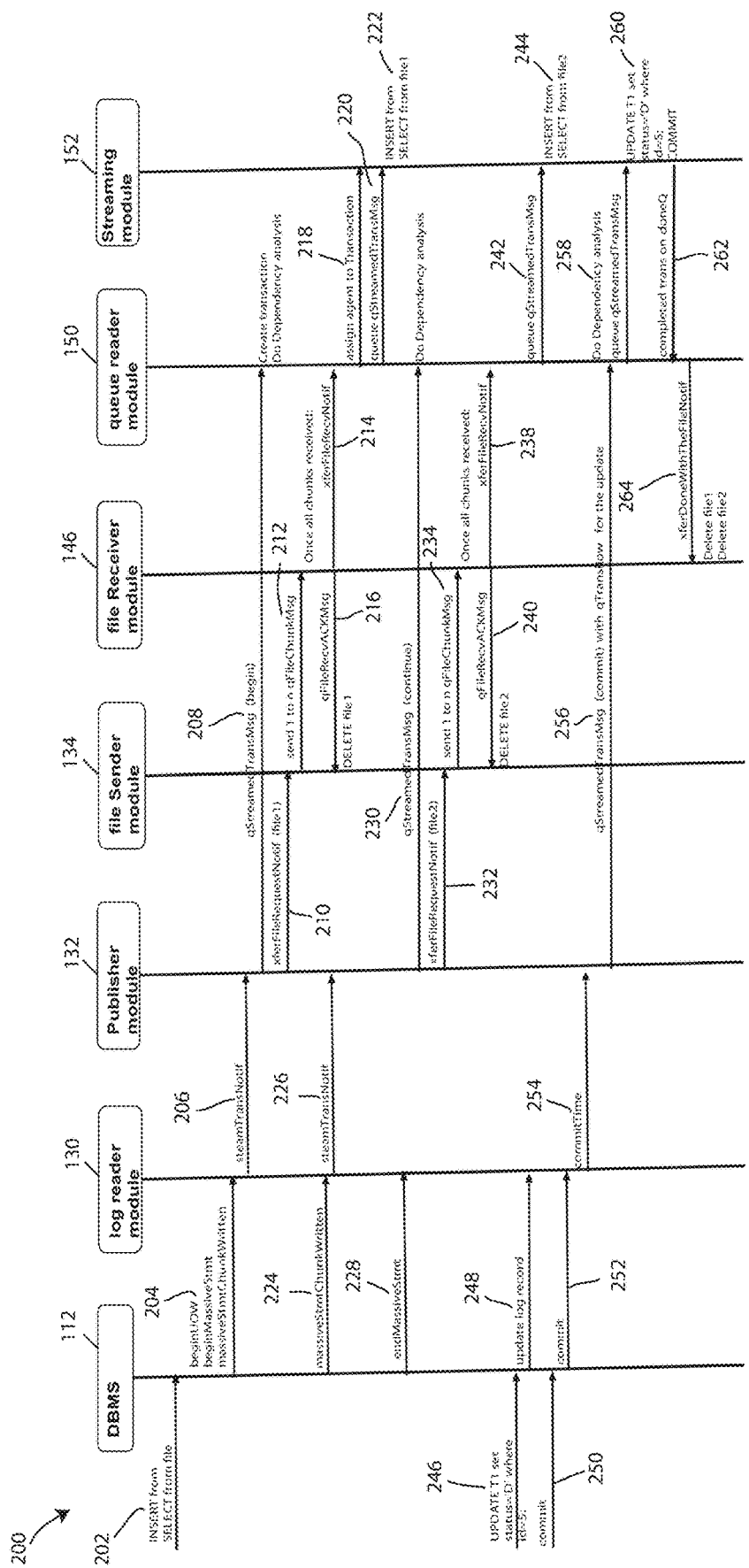
FIG. 2 depicts a process protocol for the system of replicating large statements with low latency of FIG. 1, in accordance with embodiments of the present invention.

FIG. 2 depicts a process protocol 200 for the system of replicating large statements with low latency 100 of FIG. 1, in accordance with embodiments of the present invention. The process protocol 200 is shown including processes performable by the source DBMS 112, the log reader module 130, the publisher module 132, the file sender module 134, the file receiver module 146, the queue reader module 150, and the streaming module 152.

At process 202, an "INSERT from" and "SELECT from" statement is received from, for example, the application 118 by the DBMS 112. The DBMS 112 begins a unit of work at process 204 by determining the statement is large enough, and beginning to write the smaller sets of files pertaining to the statement. At process 206, the log reader module 130 notifies the publisher module 132 of the incoming stream. The publisher module 132 transmits a begin message to the queue reader module 150 at process 208, which creates a transaction and begins a dependency analysis. At process 210, the publisher module 132 provides a transfer file request to the file sender module 134 for the first file of the smaller sets of files pertaining to the large or massive statement. Process 212 includes the file sender module 134 providing a message to the file receiver module 146 pertaining to the first file being sent. The file receiver module 146 acknowledges this message at process 216 while providing the queue reader module 150 a notification that the first file is being sent at process 218. After receiving this notification, the queue reader module 150 assigns an agent to the transaction at process 218 through the streaming module 152, and provides a queue streamed transaction message to the streaming module 152 at process 220. The streaming module 152 then works with the apply module 142 to apply the "INSERT from" and "SELECT from" statement from the first file received at process 222.

Meanwhile, at process 224, the DBMS 112 provides notifications to the log reader module 130 when more work is completed, as more files of the smaller set of files are written. Notifications are provided from the log reader module 130 to the publisher module 132, at process 226. The same process protocols 230, 232, 234, 238, 240, 242, 244 are followed for other files, as described hereinabove with processes 208, 210, 212, 214, 216, 220, 222, respectively. However, at this point, the agent has already been created as a result of process step 218, and no such process step needs to be included for each additional file sent. When the massive statement is completed, a process 228 includes providing a completion message by the DBMS 112 to the log reader module 130.

When an "UPDATE T1 . . . " statement is received by the DBMS 112 at process 246, the DBMS 112 sends an update log record message to the log reader module 130 initiating the log reader module 130 to update the log record associated with the "UPDATE T1 . . . " statement. Then, at process 250, a commit instruction is received by the DBMS 112. The DBMS provides a commit message to the log reader module 130 at process 252. The log reader module 130 provides a commit time to the publisher module 132 at process 254. The publisher module 132 provides a commit message to the que reader module 150 related to the update. The queue reader module 150 performs a dependency analysis and provides a queue streamed transaction message to the streaming module 152 at process 258. The streaming module 152, with the apply module 142 and/or the browser module 144 perform the commit at process 260. Thereafter, the streaming module 152 provides a completed transaction message at process 262 to the queue reader module 150. The queue reader module 150 provides a transfer done message 264 to the file receiver module 146 at process 264. An acknowledgement may then be provided by the file receive module 146 to the file sender module 134 related to the completion of the commit instruction, if necessary (not shown). The individual files may be deleted by the file receiver module 146 after commit.

Figure 3:
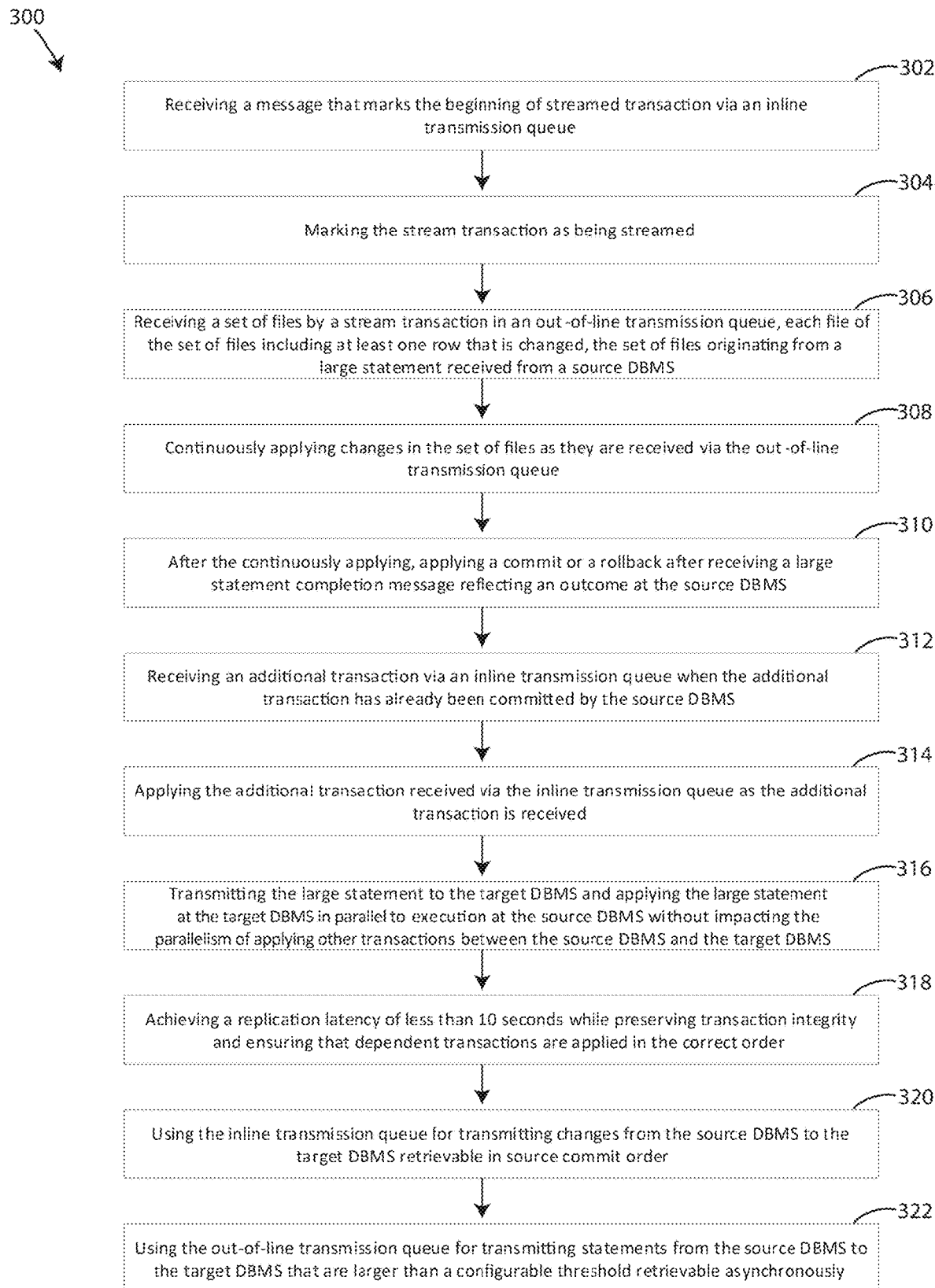
FIG. 3 depicts a flow chart of a computer-implemented method, in accordance with embodiments of the present invention.

FIG. 3 depicts a flow chart of a computer-implemented method 300, in accordance with embodiments of the present invention. The method 300 may be performable by a single DBMS, such as the target DBMS 116 described hereinabove. The method 300 may also include steps performable by either or both of a target DBMS, such as the target DBMS 116, and a source DBMS, such as the source DBMS 112. The method 300 includes a step 302 of receiving a message that marks the beginning of a streamed transaction via an inline transmission queue. The method includes a step 304 of marking the stream transaction as being streamed. The method 300 includes a step 306 of receiving a set of files by a streamed transaction in an out-of-band transmission queue. Each file of the set of files include at least one row that is changed. The set of files originate from a large statement received from a source DBMS. The method 300 includes a step 308 of continuously applying changes in the set of files as they are received via the out-of-band transmission queue. After the step 308, the method 300 includes a step 310 of applying a commit or a rollback after receiving a large statement completion message reflecting an outcome at the source DBMS. The large statement completion message may be a rollback instruction, or a commit instruction, for example. The method 300 includes a step 312 of receiving an additional transaction via an inline transmission queue when the additional transaction has already been committed by the source DBMS. The method 300 includes a step 314 of applying the additional transaction received via the inline transmission queue as the additional transaction is received. The method 300 includes a step 316 of transmitting the large statement to the target DBMS and applying the large statement at the target DBMS in parallel to execution at the source DBMS without impacting the parallelism of applying other transactions between the source DBMS and the target DBMS. The method 300 includes a step 318 of achieving a replication latency of less than a few seconds while preserving transaction integrity and ensuring that dependent transactions are applied in the correct order. The step 318 may alternatively include achieving a replication latency of less than 10 seconds, 5 seconds, 3 seconds, or even less than 1 second in other embodiments. The method 300 includes a step 320 of using the inline transmission queue for transmitting changes from the source DBMS to the target DBMS retrievable in source commit order, and a step 322 of using the out-of-band transmission queue for transmitting statements from the source DBMS to the target DBMS that are larger than a configurable threshold retrievable asynchronously.

Figure 4:
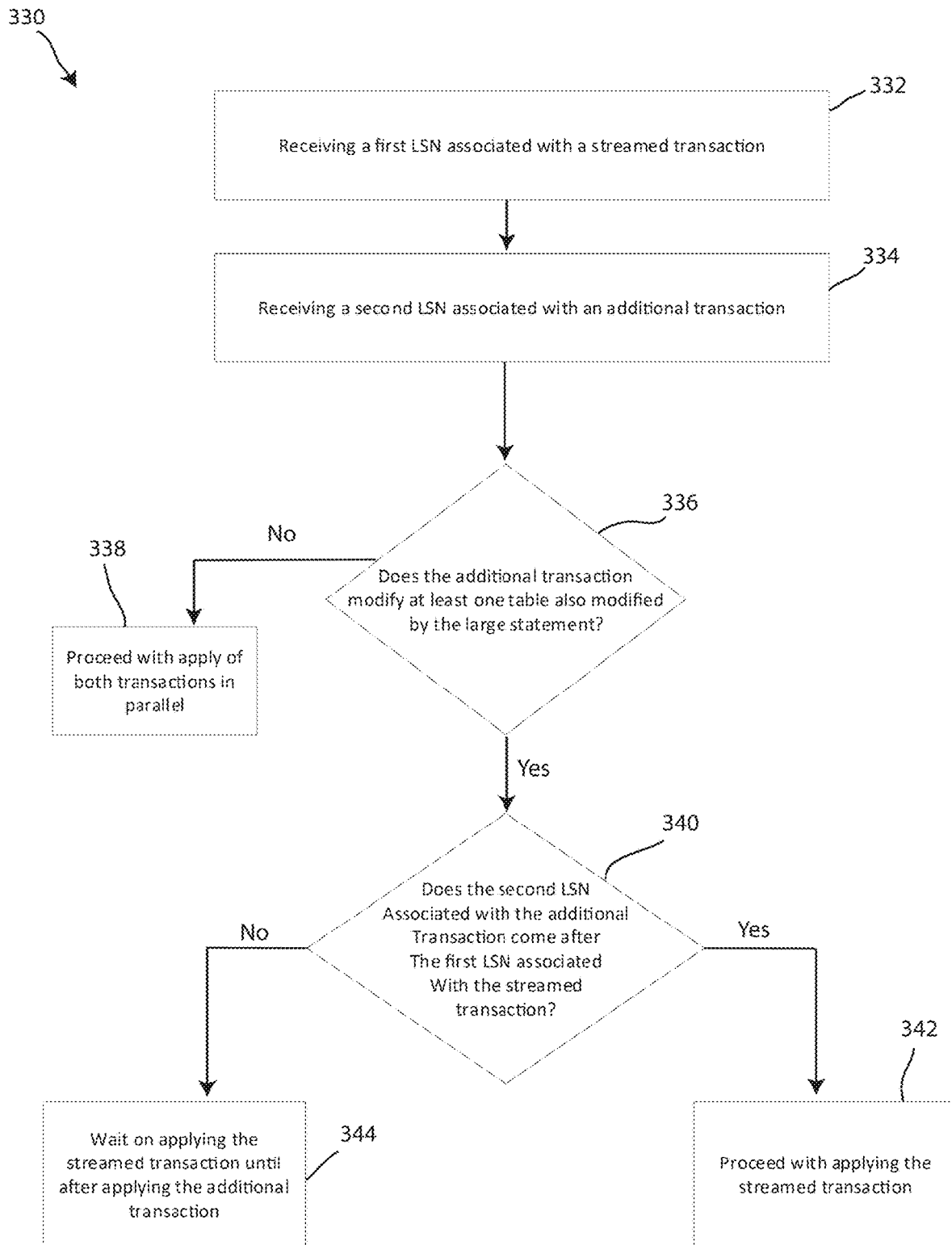
FIG. 4 depicts a flow chart of another computer-implemented method, in accordance with embodiments of the present invention.

FIG. 4 depicts a flow chart of another computer-implemented method 330, in accordance with embodiments of the present invention. In one embodiment, the method 330 may provide for additional steps to the method 300. In other embodiments, the method 330 may be included in other methods, consistent with embodiments described herein, for replication with low latency in active-active configurations. The method 330 may be performable by a single DBMS, such as the target DBMS 116 described hereinabove. The method 330 may also include steps performable by either or both of a target DBMS, such as the target DBMS 116, and a source DBMS, such as the source DBMS 112. The method 330 includes a step 332 of receiving a first LSN associated with a streamed transaction corresponding to a large statement. The method 330 includes a step 334 of receiving a second LSN associated with an additional transaction, which may be streamed or may be a small transaction received from an inline transaction queue. The method 330 includes a step 336 of determining whether the additional transaction modifies at least one table or row modified by the large statement of the streamed transaction. If the determining result is no, the method 330 includes a step 338 of proceeding with applying both the streamed transaction and the additional transaction in parallel. If the determining result is yes, the method 330 includes a step 340 of determining whether the second LSN associated with the additional transaction comes after the first LSN associated with the streamed transaction. If the result of this determining is no, the method 330 includes a step 344 of waiting on applying the streamed transaction until after applying the additional transaction. If the result of this determining is yes, the method 330 includes the step 342 of proceeding with applying the streamed transaction. The method 330 may also optionally include waiting on applying the additional transaction until after the streamed transaction.

Figure 5:
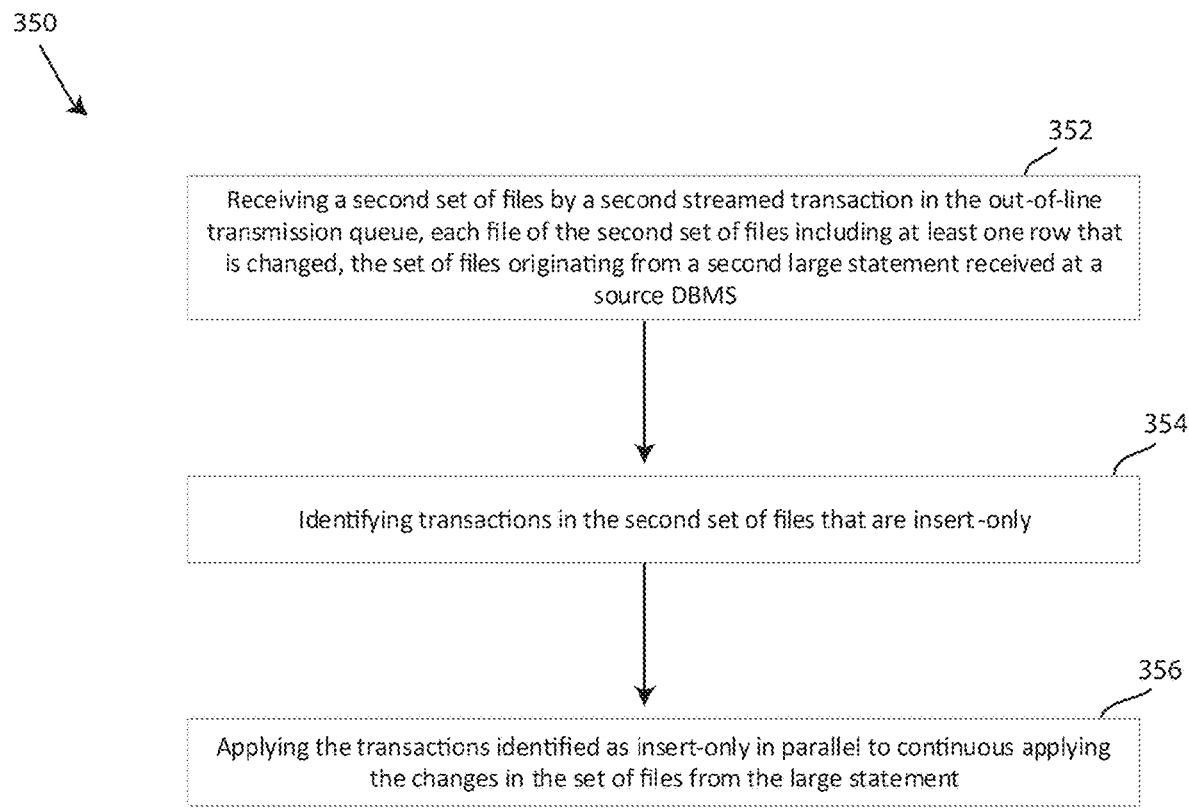
FIG. 5 depicts a flow chart of another computer-implemented method, in accordance with embodiments of the present invention.

FIG. 5 depicts a flow chart of another computer-implemented method 350, in accordance with embodiments of the present invention. In one embodiment, the method 350 may provide for additional steps to the method 300, and/or the method 330. In other embodiments, the method 350 may be included in other methods, consistent with embodiments described herein, for replication with low latency in active-active configurations. The method 350 may be performable by a single DBMS, such as the target DBMS 116 described hereinabove. The method 350 may also include steps performable by either or both of a target DBMS, such as the target DBMS 116, and a source DBMS, such as the source DBMS 112. The method 350 includes a step 352 of receiving a second set of files by a second streamed transaction in the out-of-band transmission queue in addition to the first set of files from the method 300, each file of the second set of files including at least one row that is changed, the set of files originating from a second large statement received at a source DBMS. The method 350 includes a step 354 of identifying transactions in the second set of files that are insert-only. The method 350 includes a step 356 of applying the transactions identified as insert-only in parallel to continuous applying the changes in the set of files from the large statement of method 300.

Figure 6:
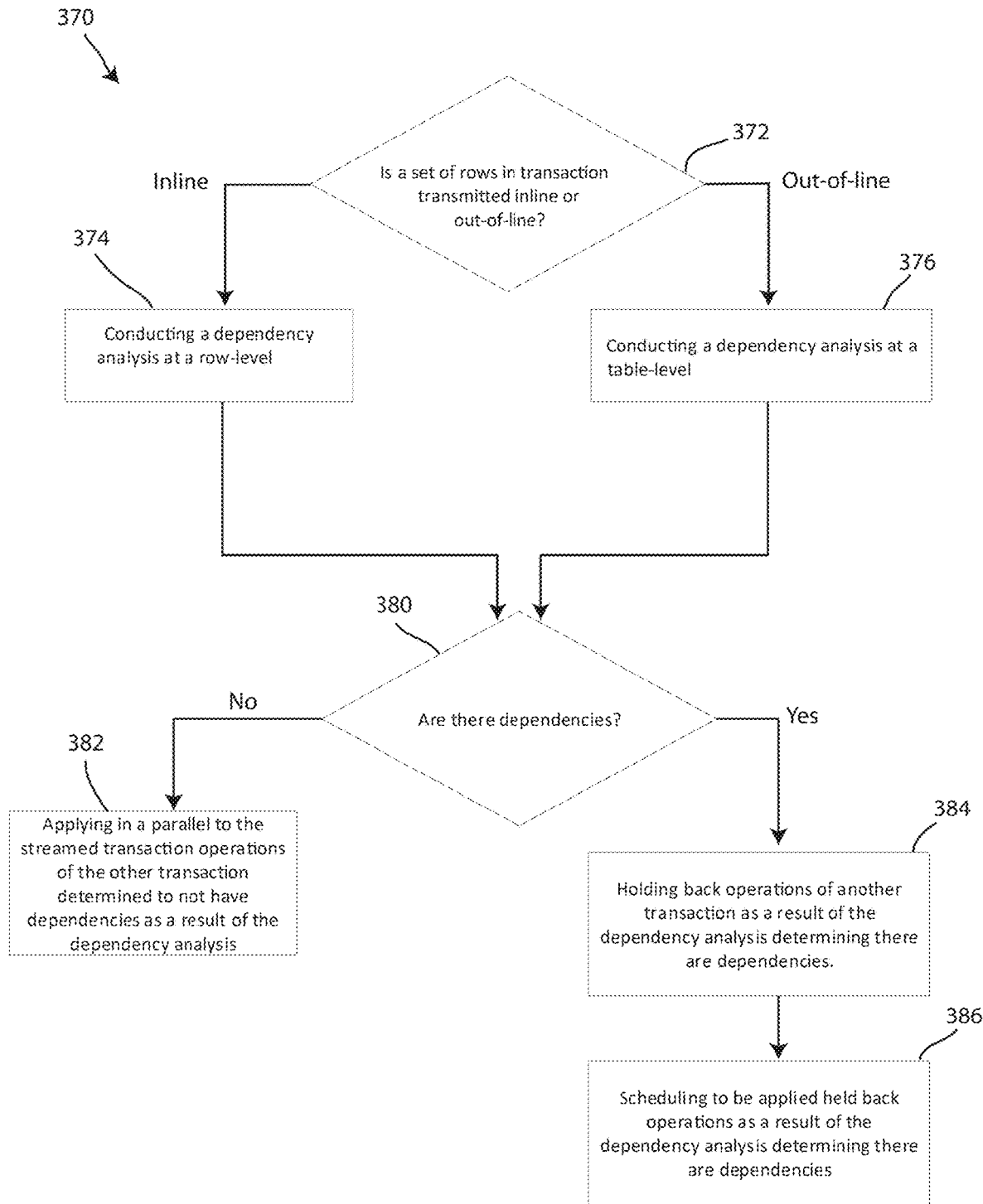
FIG. 6 depicts a flow chart of another computer-implemented method, in accordance with embodiments of the present invention.

FIG. 6 depicts a flow chart of another computer-implemented method, in accordance with embodiments of the present invention. In one embodiment, the method 370 may provide for additional steps to the method 300, and/or the method 330, and/or the method 350. In other embodiments, the method 370 may be included in other methods, consistent with embodiments described herein, for replication with low latency in active-active configurations. The method 370 may be performable by a single DBMS, such as the target DBMS 116 described hereinabove. The method 370 may also include steps performable by either or both of a target DBMS, such as the target DBMS 116, and a source DBMS, such as the source DBMS 112. The method 370 includes a 372 of determining whether a received set of rows is transmitted inline or out-of-band. If it is determined that the set of rows received is for a streamed transaction, the method 370 includes a step 376 of conducting a dependency level analysis at a table-level. If it is determined that the set of rows received was received inline and not as part of a streamed transaction, the method 370 includes a step 374 of conducting a dependency level analysis at a row-level. In the case of a set of rows being received in an inline transmission, the method 370 further includes a step 375 of determining whether there are other out-of-band transactions on the same table that are committed at the source DBMS. If so, the method includes conducting a dependency analysis with respect to these source-committed out-of-band transactions at a table-level. Once dependency analysis is conducted as appropriate, the method 370 includes a step 380 of determining whether there are dependencies. If the step 380 determines that no dependencies exist, the method 370 includes applying in parallel to the streamed transaction operations of the other transaction determined to not have dependencies. If the step 380 determines that there are dependencies, the method 370 includes holding back operations of another transaction as a result of the dependency analysis of step 380 determining there are dependencies, and a step 386 of scheduling held back operations to be applied as a result of the dependency analysis of step 380 determining there are dependencies.

Various additional contemplated but not shown method steps may be contemplated and incorporated into the methods of FIGS. 3-6 conducted by a target DBMS such as the target DBMS 116. For example, methods may include using a dedicated streaming agent associated with the streamed transaction. Methods may include ensuring, by the dedicated streaming agent, order is respected associated with the streamed transaction using coordination messages, and enabling, by the dedicated streaming agent, the streamed transaction to be applied under a single commit scope. Methods contemplated may include holding back committing a transaction that is committing after the commit or the rollback of the streamed transaction until after the commit or the rollback of the streamed transaction. Methods may further include applying transactions that are committed at the source database management system while the streamed transaction is being applied in parallel at the target database management system, and applying any subsequent files from the set of files after the transactions that are committed at the source database management system are applied and committed by the target database management system.

Figure 7:
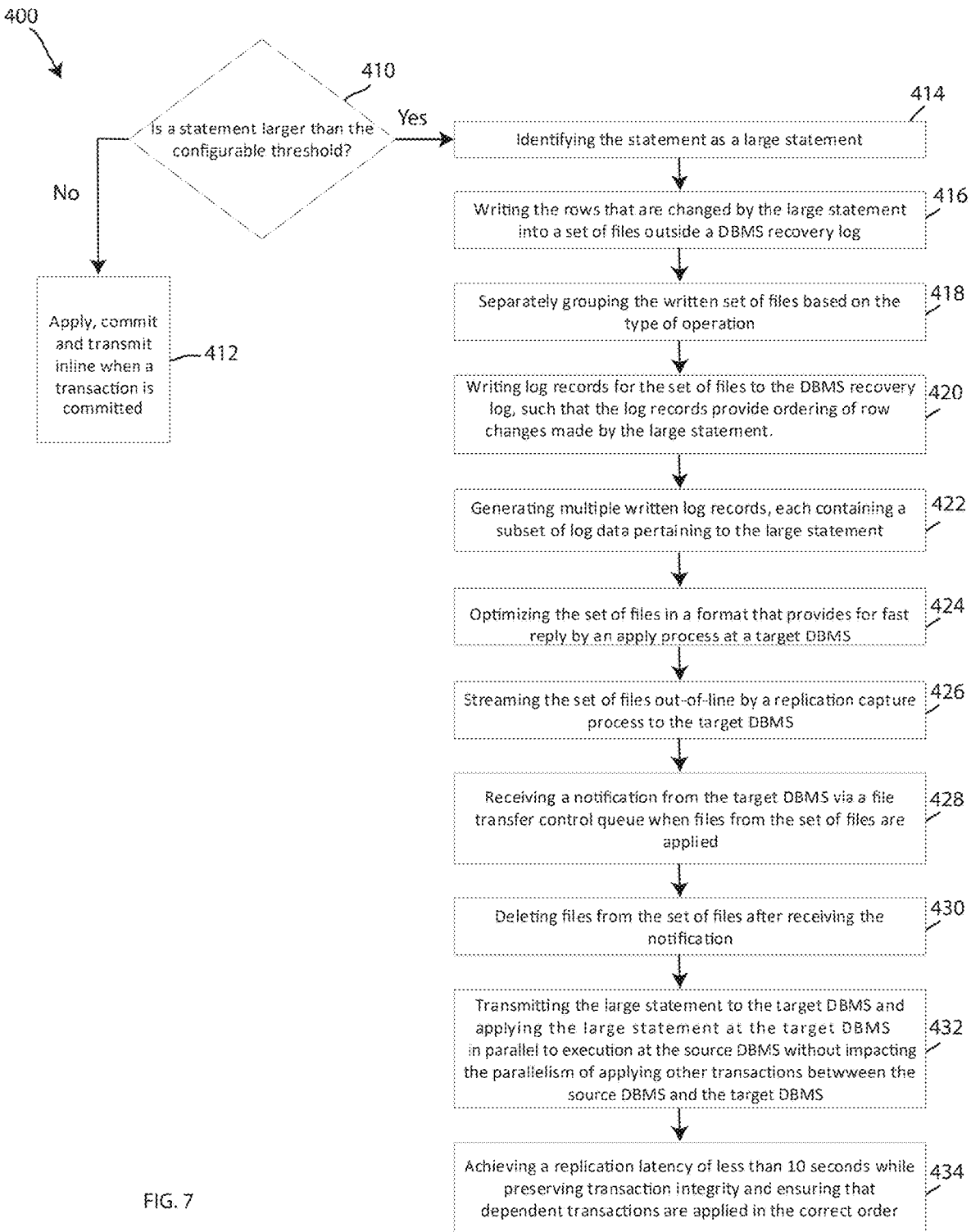
FIG. 7 depicts a flow chart of another computer-implemented method, in accordance with embodiments of the present invention.

FIG. 7 depicts a flow chart of another computer-implemented method, in accordance with embodiments of the present invention. The method 400 may be performable by a single DBMS, such as the source DBMS 112 described hereinabove. The method 400 may be performable by a single DBMS, such as the source DBMS 112. The method 300 may also include steps performable by either or both of a source DBMS, such as the source DBMS 112, and a target DBMS, such as the target DBMS 116. In one embodiment, the method 400 may provide for additional steps to the method 300, and/or the method 330, and/or the method 350, and/or the method 370. In other embodiments, the method 400 may be included in other methods, consistent with embodiments described herein, for replication with low latency in active-active configurations. The method 400 includes a step 410 of determining whether a statement is larger than a configurable threshold. If the determining step 410 determines that the statement is not larger than a configurable threshold, the method 400 includes a step 412 of applying, committing and transmitting the statement inline from a source DBMS to a target DBMS when a transaction is committed. If the determining step 410 determines that the statement not larger than a configurable threshold, the method 400 includes a step 414 of identifying the statement as a large statement. The method 400 then includes a step 416 of writing the rows that are changed by the large statement into a set of files outside a DBMS recovery log. The method 400 includes a step 418 of separately grouping the written set of files based on the type of operation. The method 400 includes a step 420 of writing log records for the set of files to the DBMS recovery log, such that the log records provide ordering or row changes made by the large statement. The log records may include a log sequence number (LSN) corresponding to at least a first row changed and a format and encoding used for row changes. The method 400 includes a step 422 of generating multiple written log records, each containing a subset of log data pertaining to the large statement. The method 400 includes a step 424 of optimizing the set of files in a format that provides for fast reply by an apply process at a target DBMS. The method 400 includes a step 426 of streaming the set of files out-of-band by a replication capture process to the target DBMS. The method 400 includes a step 428 of receiving a notification from the target DBMS via a file transfer control queue when files from the set of files are applied. The method 400 includes a step 430 of deleting files from the set of files after receiving the notification. The method 400 includes a step 432 of transmitting the large statement to the target DBMS and applying the large statement at the target DBMS in parallel to execution at the source DBMS without impacting the parallelism of applying other transactions between the source DBMS and the target DBMS. The method 400 includes a step 434 of achieving a replication latency of less than a few seconds while preserving transaction integrity and ensuring that dependent transactions are applied in the correct order. "A few" seconds may be less than, for example, 10 seconds, 5 seconds, 3 seconds, or even 1 second. The step 434 may alternatively include achieving a replication latency of less than 5 seconds, 3 seconds, or even less than 1 second in other embodiments.

Further contemplated within the method 400 are other method steps not shown. For example, the method 400 may include a step of sending a message that marks the beginning of a streamed transaction via an inline transmission queue. The method 400 may include sending a set of files originating from a large statement in a streamed transaction in an out-of-band transmission queue. The method 400 may include sending additional transactions via the inline transmission queue after being committed by the source DBMS during the sending of the set of files of the large statement in the out-of-band transmission queue. The method 400 may include concurrently transmitting sets of files originating from two large statements in a streamed transaction in an out-of-band transmission queue. The method 400 may include transmitting smaller statements, files or transactions in source commit order in the inline transmission queue. The method 400 may include sending LSNs associated with transactions, including the streamed transaction, by the source DBMS to the target DBMS.

Figure 8:
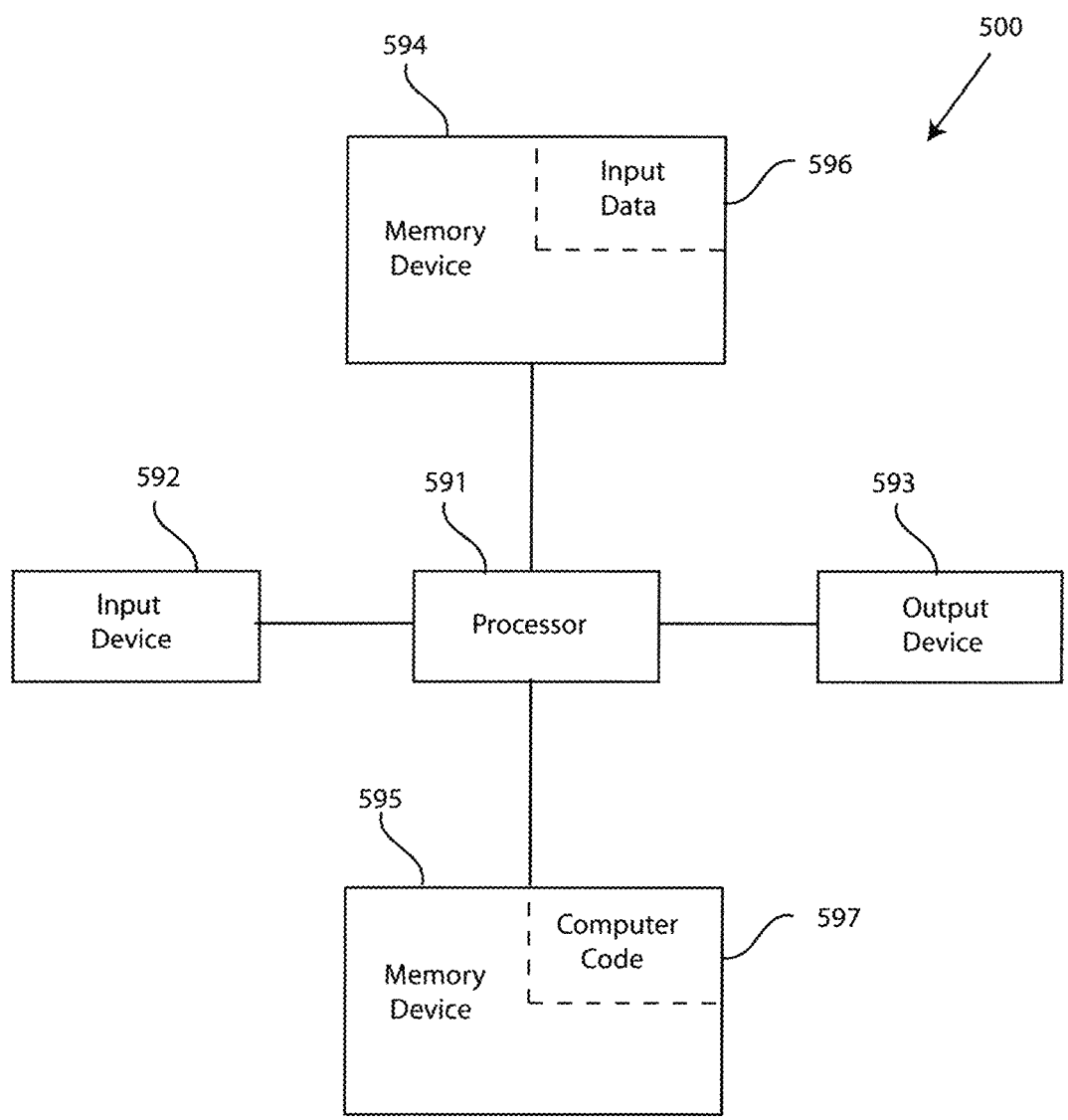
FIG. 8 depicts a block diagram of a computer system of the system of replicating large statements with low latency of FIG. 1, capable of implementing the methods of FIGS. 2-7, in accordance with embodiments of the present invention.

FIG. 8 illustrates a block diagram of a computer system that may representative of any computer or computer system within the system of replicating large statements with low latency 100 of FIG. 1, capable of implementing computer-implemented methods of FIGS. 2-7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method of replicating large statements with low latency, in the manner prescribed by the embodiments of FIGS. 2-4 using the system of replicating large statements with low latency 100 of FIG. 1, wherein the instructions of the computer code 597 may be executed by processor 591 via memory device 595. The computer code 597 may include software or program instructions that may implement one or more algorithms for implementing the methods of replicating large statements with low latency, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 8.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods of replicating large statements with low latency. Thus, an embodiment of the present invention discloses a process for supporting computer infrastructure, where the process includes providing at least one support service for at least one of integrating, hosting, maintaining and deploying computer-readable code (e.g., computer code 597) in a computer system (e.g., computer system 500) including one or more processor(s) 591, wherein the processor(s) carry out instructions contained in the computer code 597 causing the computer system provide a system of replicating large statements with low latency. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements methods of replicating large statements with low latency. Thus, the present invention discloses a process for supporting, deploying and/or integrating computer infrastructure, integrating, hosting, maintaining, and deploying computer-readable code into the computer system 500, wherein the code in combination with the computer system 500 is capable of performing methods of replicating large statements with low latency.

A computer program product of the present invention comprise one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
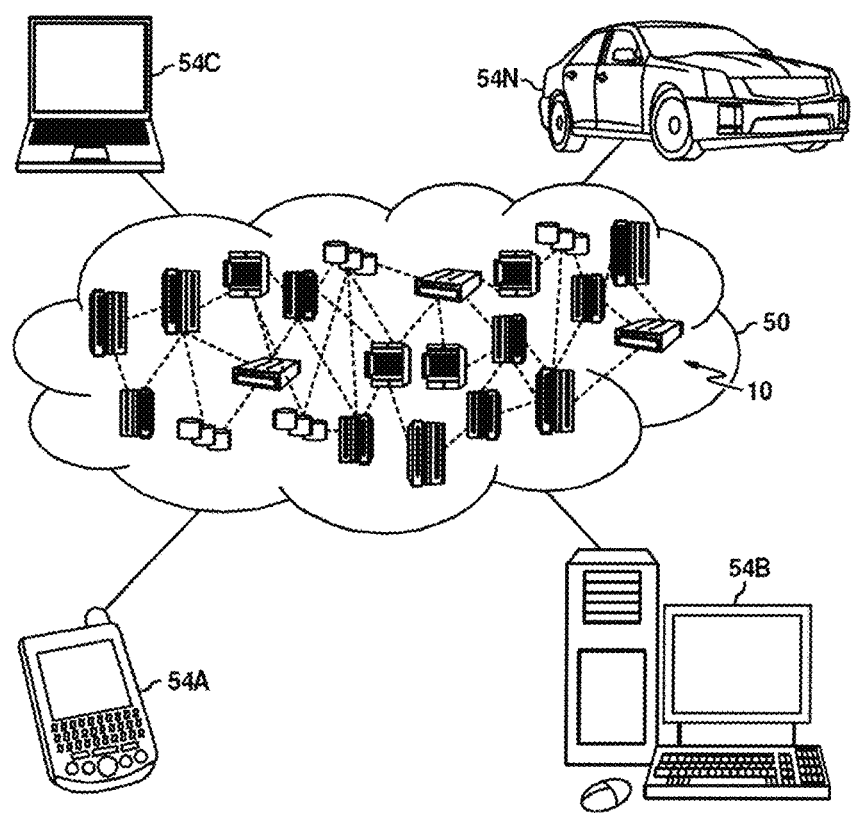
FIG. 9 depicts a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
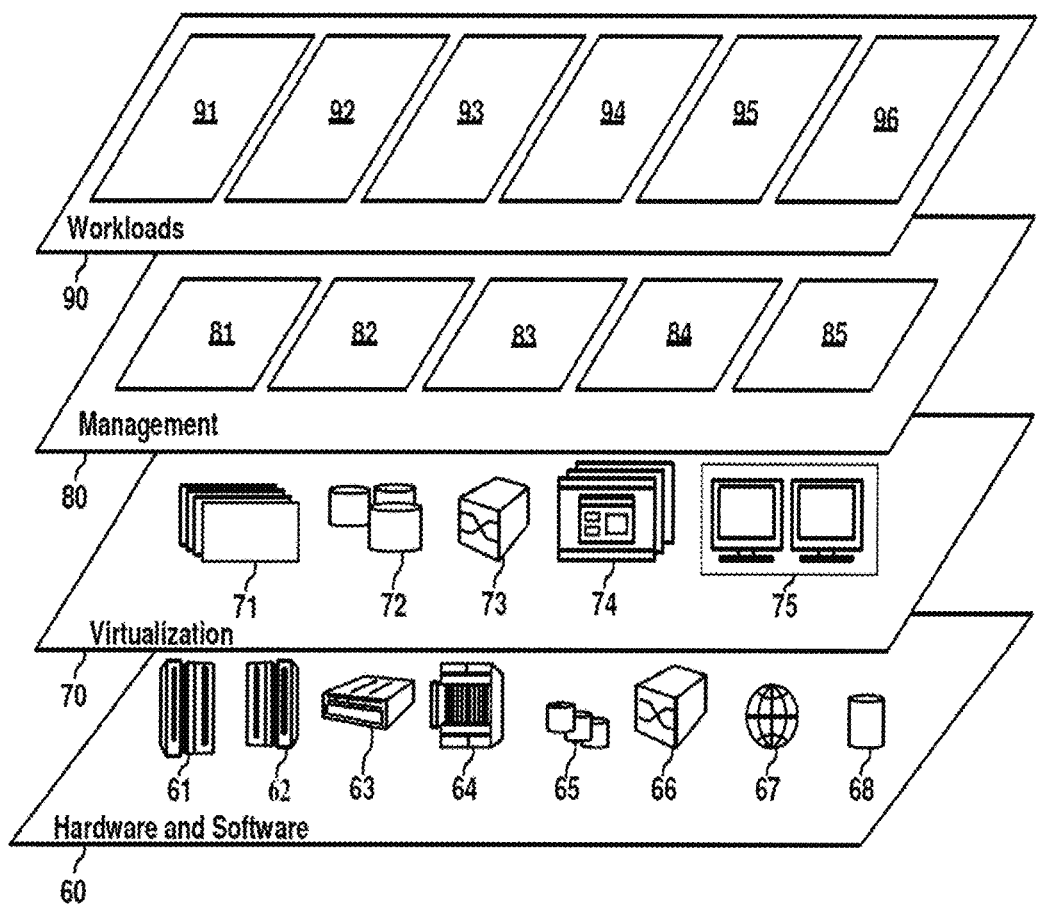
FIG. 10 depicts abstraction model layers, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to replicating large statements with low latency 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
when a large statement is a single statement that is larger than a threshold, receiving, by one or more processors of a computer system, the large statement as a set of files by a streamed transaction in an out-of-band transmission queue, each file of the set of files including at least one row that is changed, the set of files originating from the large statement that is at least 10 megabytes in size received at a source database management system that has identified the large statement is the single statement that is larger than the threshold;
continuously applying, by the one or more processors of the computer system, changes in the set of files as they are received via the out-of-band transmission queue;
when an additional transaction is a single statement that is smaller than a threshold, receiving, by the one or more processors of the computer system during the continuously applying changes in the set of files as they are received via the out-of-band transmission queue, the additional transaction via an inline transmission queue from the source database management system that has identified that the additional transaction is smaller than the threshold; and
applying, by the one or more processors of the computer system, the additional transaction received via the inline transmission queue as the additional transaction is received during receiving the set of files by the streamed transaction or the continuously applying; and
after the continuously applying, applying, by the one or more processors of the computer system, a commit or a rollback after receiving a large statement completion message by the source database management system, the large statement completion message reflecting an outcome at the source database management system.

2. The method of claim 1, wherein the additional transaction has already been committed by the source database management system.

3. The method of claim 2, further comprising:
receiving, by the one or more processors of the computer system, a message that marks the beginning of the streamed transaction via the inline transmission queue;
marking, by the one or more processors of the computer system, the streamed transaction as being streamed.

4. The method of claim 3, further comprising:
receiving, by the one or more processors of the computer system, a first log sequence number associated with the streamed transaction with the message that marks the beginning of the streamed transaction;
receiving, by the one or more processors of the computer system, a second log sequence number associated with the additional transaction;
determining, by the one or more processors of the computer system, that the additional transaction modifies at least one table also modified by the large statement;
determining, by the one or more processors of the computer system, that the second log sequence number associated with the additional transaction comes after the first log sequence number associated with the streamed transaction;
waiting, by the one or more processors of the computer system, to start the continuous applying until after the determining that the second log sequence number associated with the additional transaction is after the first log sequence number associated with the streamed transaction.

5. The method of claim 2, wherein rows from a statement in any transaction sent via either the inline or out-of-band transmission queue are not applied by the target database management system until all commit or abort source transactions pertaining to the same row or table as the statement and having an log sequence number less than an log sequence number of the statement have been committed or aborted at the target database management system.

6. The method of claim 1, further comprising:
using, by the one or more processors of the computer system, a dedicated streaming agent associated with the streamed transaction;
ensuring, by the dedicated streaming agent, order is respected associated with the streamed transaction using coordination messages that are transmitted over the inline transmission queue; and
enabling, by the dedicated streaming agent, the streamed transaction to be applied under a single commit scope.

7. The method of claim 1, further comprising:
conducting, by the one or more processors of the computer system, a dependency analysis at a table-level for the streamed transaction.

8. The method of claim 1, further comprising:
holding back committing, by the one or more processors of the computer system, a transaction that is committing after the commit or the rollback of the streamed transaction until after the commit or the rollback of the streamed transaction.

9. The method of claim 1, further comprising:
applying, by the one or more processors of the computer system, transactions that are committed at the source database management system while the streamed transaction is being applied in parallel at the target database management system; and
applying, by the one or more processors of the computer system, any subsequent files from the set of files after the transactions that are committed at the source database management system are applied and committed by the target database management system.

10. The method of claim 1, further comprising:
receiving, by one or more processors of a computer system, a second set of files associated with a second streamed transaction in the out-of-band transmission queue, each file of the second set of files including at least one row that is changed, the set of files originating from a second large statement received at a source database management system;
identifying, by the one or more processors of the computer system, transactions in the second set of files that are insert-only;
applying, by the one or more processors of the computer system, the transactions identified as insert-only in parallel to the continuously applying the changes in the set of files from the large statement.

11. The method of claim 1, further comprising:
conducting, by the one or more processors of the computer system, a dependency analysis at a table-level if the streamed transaction is determined to be larger than a configurable threshold; and
conducting, by the one or more processors of the computer system, the dependency analysis at a row-level if the streamed transaction is determined to be smaller than the configurable threshold; and holding back operations of another transaction, by the one or more processors of the computer system, as a result of the dependency analysis.

12. The method of claim 1, further comprising:
scheduling to be applied, by the one or more processors of the computer system, held back operations as a result of the dependency analysis; and
applying in parallel to the streamed transaction, by the one or more processors of the computer system, operations of the other transaction determined to not have dependencies as a result of the dependency analysis.

13. The method of claim 1, wherein the large statement completion message is either a commit instruction or a rollback instruction.

14. The method of claim 1, further comprising:
transmitting the large statement to the target database management system and applying the large statement at the target database management system in parallel to execution at the source database management system without impacting the parallelism of applying other transactions between the source database management system and the target database management system;
achieving a replication latency of less than a few seconds while preserving transaction integrity and ensuring that dependent transactions are applied in the correct order.

15. The method of claim 2, further comprising:
using the inline transmission queue for transmitting changes from the source database management system to the target database management system retrievable in source commit order; and
using the out-of-band transmission queue for transmitting statements from the source database management system to the target database management system that are larger than a configurable threshold retrievable asynchronously, and for transmitting coordinating messages used for ordering the transmitted changes using the inline transmission queue from the source database.

16. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method of replication, the method comprising:
when a large statement is a single statement that is larger than a threshold, receiving, by the one or more processors of the computer system, the large statement as a set of files by a streamed transaction in an out-of-band transmission queue, each file of the set of files including at least one row that is changed, the set of files originating from the large statement that is at least 10 megabytes in size received at a source database management system that has identified the large statement is the single statement that is larger than the threshold;
continuously applying, by the one or more processors of the computer system, changes in the set of files as they are received via the out-of-band transmission queue;
when an additional transaction is a single statement that is smaller than a threshold, receiving, by the one or more processors of the computer system during the continuously applying changes in the set of files as they are received via the out-of-band transmission queue, the additional transaction via an inline transmission queue from the source database management system that has identified that the additional transaction is smaller than the threshold; and
applying, by the one or more processors of the computer system, the additional transaction received via the inline transmission queue as the additional transaction is received during receiving the set of files by the streamed transaction or the continuously applying; and
after the continuously applying, applying, by the one or more processors of the computer system, a commit or a rollback after receiving a large statement completion message by the source database management system, the large statement completion message reflecting an outcome at the source database management system.

17. A computer program product, comprising a computer readable hardware storage device storing a computer readable program code, the computer readable program code comprising an algorithm that when executed by one or more processors of a computer system implements a method of replication, the method comprising:
when a large statement is a single statement that is larger than a threshold, receiving, by the one or more processors of the computer system, the large statement as a set of files by a streamed transaction in an out-of-band transmission queue, each file of the set of files including at least one row that is changed, the set of files originating from the large statement that is at least 10 megabytes in size received at a source database management system that has identified the large statement is the single statement that is larger than the threshold;
continuously applying, by the one or more processors of the computer system, changes in the set of files as they are received via the out-of-band transmission queue;
when an additional transaction is a single statement that is smaller than a threshold, receiving, by the one or more processors of the computer system during the continuously applying changes in the set of files as they are received via the out-of-band transmission queue, the additional transaction via an inline transmission queue from the source database management system that has identified that the additional transaction is smaller than the threshold; and
applying, by the one or more processors of the computer system, the additional transaction received via the inline transmission queue as the additional transaction is received during receiving the set of files by the streamed transaction or the continuously applying; and
after the continuously applying, applying, by the one or more processors of the computer system, a commit or a rollback after receiving a large statement completion message by the source database management system, the large statement completion message reflecting an outcome at the source database management system.

* * * * *